(12) United States Patent
Shih et al.

(10) Patent No.: US 10,728,172 B2
(45) Date of Patent: Jul. 28, 2020

(54) METHOD AND SYSTEM FOR ALLOCATING SYSTEM RESOURCES

(71) Applicant: QUANTA COMPUTER INC., Taoyuan (TW)

(72) Inventors: Ching-Chih Shih, Taoyuan (TW); Feng-Kuang Wu, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 16/018,998

(22) Filed: Jun. 26, 2018

(65) Prior Publication Data

US 2019/0306083 A1 Oct. 3, 2019

Related U.S. Application Data

(60) Provisional application No. 62/649,212, filed on Mar. 28, 2018.

(51) Int. Cl.
| | |
|---|---|
| *H04L 12/933* | (2013.01) |
| *H04L 12/935* | (2013.01) |
| *G06F 13/40* | (2006.01) |
| *H04L 12/947* | (2013.01) |
| *H04L 12/931* | (2013.01) |

(52) U.S. Cl.
CPC .......... *H04L 49/10* (2013.01); *G06F 13/4022* (2013.01); *H04L 49/15* (2013.01); *H04L 49/25* (2013.01); *H04L 49/70* (2013.01)

(58) Field of Classification Search
CPC ......... H04L 49/10; H04L 49/15; H04L 49/25; H04L 49/70
See application file for complete search history.

(56) References Cited

U.S. PATENT DOCUMENTS

| 9,148,350 B1 * | 9/2015 | Suryanarayanan ..... H04L 43/08 |
| 2007/0043919 A1 | 2/2007 | Gemba et al. |
| 2007/0136458 A1 | 6/2007 | Boyd et al. |
| | | (Continued) |

FOREIGN PATENT DOCUMENTS

| CN | 107851043 A | 3/2018 |
| JP | 2004-21557 A | 1/2004 |
| TW | 201701612 A | 1/2017 |

OTHER PUBLICATIONS

TW Office Action for Application No. 107128603, dated Apr. 22, 2019, w/First Office Action Summary.

(Continued)

*Primary Examiner* — Brian P Cox
(74) *Attorney, Agent, or Firm* — Nixon Peabody LLP

(57) ABSTRACT

A system and method for efficiently allocating device resources is disclosed. A composer application is executed by a management controller. A fabric box includes fabric switches and a fabric controller. A network is coupled to the management controller and the fabric box. Host servers are each coupled to an upstream port of one of the fabric switches. Multiple device resources are coupled to downstream ports of the fabric switches. The fabric controller determines the path distances between each of the downstream ports and each of the upstream ports. The composer application selects a device based on the shortest path distance to a requested host server in response to an allocation command.

20 Claims, 7 Drawing Sheets

(56) References Cited

U.S. PATENT DOCUMENTS

| | | | |
|---|---|---|---|
| 2009/0172191 A1* | 7/2009 | Dumitriu | H04L 67/1029 709/241 |
| 2014/0359195 A1 | 12/2014 | Nishiyashiki | |
| 2015/0026385 A1 | 1/2015 | Egi et al. | |
| 2015/0370665 A1* | 12/2015 | Cannata | G06F 3/0685 714/4.11 |
| 2016/0092328 A1 | 3/2016 | Yeom et al. | |
| 2017/0046293 A1 | 2/2017 | Lasater | |
| 2017/0255583 A1* | 9/2017 | Shih | G06F 13/4022 |
| 2018/0046513 A1 | 2/2018 | Breakstone et al. | |
| 2018/0246833 A1* | 8/2018 | Bai | G06F 13/4022 |
| 2018/0276161 A1* | 9/2018 | Ahn | G06F 13/4009 |
| 2019/0149461 A1* | 5/2019 | Camacho Villanueva | H04L 45/48 |

OTHER PUBLICATIONS

TW Search Report for Application No. 107128603, dated Apr. 22, 2019, w/First Office Action.

EP Extended European Search Report for Application No. 18192257.6, dated Mar. 14, 2019.

JP Office Action for Application No. 2018-164517, dated Sep. 24, 2019, w/ First Office Action Summary.

\* cited by examiner

METHOD AND SYSTEM FOR ALLOCATING SYSTEM RESOURCES

CROSS-REFERENCE TO RELATED APPLICATIONS

This application claims priority to and the benefit of U.S. Provisional Patent Application No. 62/649,212, entitled "PATH DISTANCE OPTIMIZED DEVICE ALLOCATION MECHANISM FOR A POOLED DEVICE BOX" and filed Mar. 28, 2018, the contents of which are hereby incorporated by reference in their entirety as if fully set forth herein.

TECHNICAL FIELD

The present disclosure relates generally to efficiently allocating devices on a fabric card box. More particularly, aspects of this disclosure relate to calculating a path distance of pooled devices to assist in efficient allocation to host devices.

BACKGROUND

The emergence of the cloud for computing applications has increased the demand for off-site installations, known as data centers, that store data and run applications accessed by remotely connected computer device users. Such data centers typically have massive numbers of servers, switches, and storage devices to store and manage data. A typical data center has physical rack structures with attendant power and communication connections. The racks are arranged in rows throughout the room or rooms of the data center. Each rack includes a frame that has slots or chassis between two side walls. The slots may hold multiple network devices such as servers, switches, and storage devices. There are many such network devices stacked in such rack structures found in a modern data center. For example, some data centers have tens of thousands of servers, attendant storage devices, and network switches. Thus, a typical data center may include tens of thousands, or even hundreds of thousands, of devices in hundreds or thousands of individual racks.

In order to efficiently allocate resources, data centers include many different types of devices in a pooled arrangement. Such pooled devices may be assigned to different host servers as the need for resources arises. Such devices may be connected via Peripheral Component Interconnect Express (PCIe) protocol links between the device and the host server that may be activated by a PCIe type switch.

Thus, many modern data centers now support disaggregate architectures with numerous pooled devices. An example of such a data center 10 is shown in FIG. 1. A system administrator may access a composer application 12 that allows configuration data to be sent via a router 14 to a PCIe fabric box 20. The PCIe fabric box 20 includes numerous serial expansion bus devices such as PCIe compatible devices that may be accessed by other devices in the data center. In this example, the PCIe fabric box 20 includes a fabric controller 22 that may receive configuration data through a network from the router 14. The fabric box 20 includes PCIe switches, such as the PCIe switches 24 and 26, that allow host devices such as host servers 30, 32, 34 and 36 to be connected to different PCIe devices in the fabric box 20. The PCIe switch 24 includes upstream ports 40 and 42 and the PCIe switch 26 includes upstream ports 44 and 46. The upstream ports 40, 42, 44, and 46 are connected via a cable to the host servers 30, 32, 34 and 36. The PCIe switch 24 also includes downstream ports 50, 52, 54, and 56. The PCIe switch 26 includes downstream ports 60, 62, 64, and 66. In this example, there are multiple devices in the fabric box 20 coupled to the respective downstream ports of the switches 24 and 26. These devices may be accessed by any of the host servers 30, 32, 34 and 36.

As shown in FIG. 1, two host servers 30 and 32 are directly coupled to the upstream ports 40 and 42 of the switch 24, while two host servers 34 and 36 are directly coupled to the upstream ports 44 and 46 of the switch 26. Different devices that are connected to the other switch 24 through the switch 26 may be allocated to the host servers 34 and 36. In this example, devices 70, 72, 74, and 76 are directly coupled to the downstream ports 50, 52, 54, and 56 of the PCIe switch 24. Devices 80, 82, 84, and 86 are directly coupled to the downstream ports 60, 62, 64, and 66 of the PCIe switch 26. Additional devices and host servers may be supported by adding additional PCIe switches. The example system 10 allows certain system resources to be removed from host servers and provided by the outside fabric box 20 instead. Thus, different types of system resources may be allocated to the needs of different servers as they arise. For example, the devices 70, 72, 74, 76, 80, 82, 84, and 86 may each be a resource such as a non-volatile memory (NVMe), a graphic processing unit (GPU), a field programmable gate array (FPGA), a network interface card (NIC), or other kinds of PCIe compatible devices. Each such device may be dynamically assigned to hosts, such as the host servers 30, 32, 34, and 36.

When a user desires to allocate a resource to a host, the user may send a request such as "Allocate One GPU to Host 1" to the composer application 12. The composer application 12 then allocates a GPU device such as the device 70 to the host server 30 by sending a command to the PCIe fabric controller 22. The fabric box 20 will allocate the first GPU device 70 to the host server 30 through the PCIe switch 24 or 26, as shown in a box 90 in FIG. 2.

Following the above allocation, a user may allocate another device resource to another host server. For example, the system administrator may send another request like, "Allocate One GPU to Host 3" to the composer application 12 to allocate another GPU such as the device 72 to the host server 34. The fabric box 20 will then allocate another GPU device 72 to the host server 34 through the PCIe switch 24 and the PCIe switch 26, as shown in a box 92 in FIG. 3.

One problem with fabric boxes such as the fabric box 20 in FIGS. 1-3, is the use of different fabric switches to allocate the devices to different host servers. In this case, the pooled devices have different path distances to different hosts. For purposes of the system 10, path distances are measured in number of devices required to connect the host to the device. In this example, the composer 12 may allocate a device to a host server where the distance between the device to the host is not optimal. For example, as shown in FIG. 2, when the device 70 is assigned to the host server 30, the PCIe switch 24 allows the connection to the host server 30. Thus, the distance between the host server and the device is optimized at 1. In contrast, when the device 72 is assigned to the host server 34, the connection requires spanning both PCIe switches 24 and 26, to connect to the host server 34 as shown by the box 92 (shown in FIG. 3). Thus, the path distance between the host server and the device is 2 and is not an optimized allocation. A better allocation is to allocate one of the devices 70, 72, 74, or 76 to the host server 34 as their path distances are only through the PCIe switch 26. However, the composer application 12 does not have the necessary data to perform optical allocations and may therefore result in longer path distances than necessary between an allocated device and host server.

There is need for a fabric box system that determines the minimum amount of path distance between assigned devices and a host server. There is also a need for a fabric box that will automatically factor the path distance between a requested type of device and a host in selecting a device for assignment to the host.

SUMMARY

One disclosed example is a fabric box that has a plurality of fabric switches. Each of the switches has at least one upstream port to be coupled to a host. The fabric box includes a plurality of devices coupled to downstream ports of one of the plurality of fabric switches. A fabric controller is coupled to the plurality of fabric switches. The fabric controller is operable to determine a path distance between each of the downstream ports and each of the upstream ports. Upon receiving a request for allocation of a device to a host, the controller selects one of the plurality of devices with the shortest path distance to the host, and configures one of the plurality of fabric switches to connect the host to the selected device.

Another example is a method of allocating devices to hosts via a fabric box. The fabric box includes a plurality of fabric switches, each having at least one upstream port to be coupled to a host; a plurality of devices coupled to downstream ports of one of the plurality of fabric switches; and a fabric controller coupled to the plurality of fabric switches. Path distances are determined between each of the downstream ports and each of the upstream ports. An allocation request for a device to be allocated to a host is received. A device is selected according to the shortest path distance to the allocated host. A connection via one of the plurality of fabric switches is activated between the selected device and the allocated host.

Another example is a system for efficiently allocating device resources is disclosed. A composer application is executed by a management controller. A fabric box includes fabric switches and a fabric controller. A network is coupled to the management controller and the fabric box. Host servers are each coupled to an upstream port of one of the fabric switches. Multiple device resources are coupled to downstream ports of the fabric switches. The fabric controller determines the path distances between each of the downstream ports and each of the upstream ports. The composer application selects a device based on the shortest path distance to a requested host server in response to an allocation command.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which.

Figure 1:
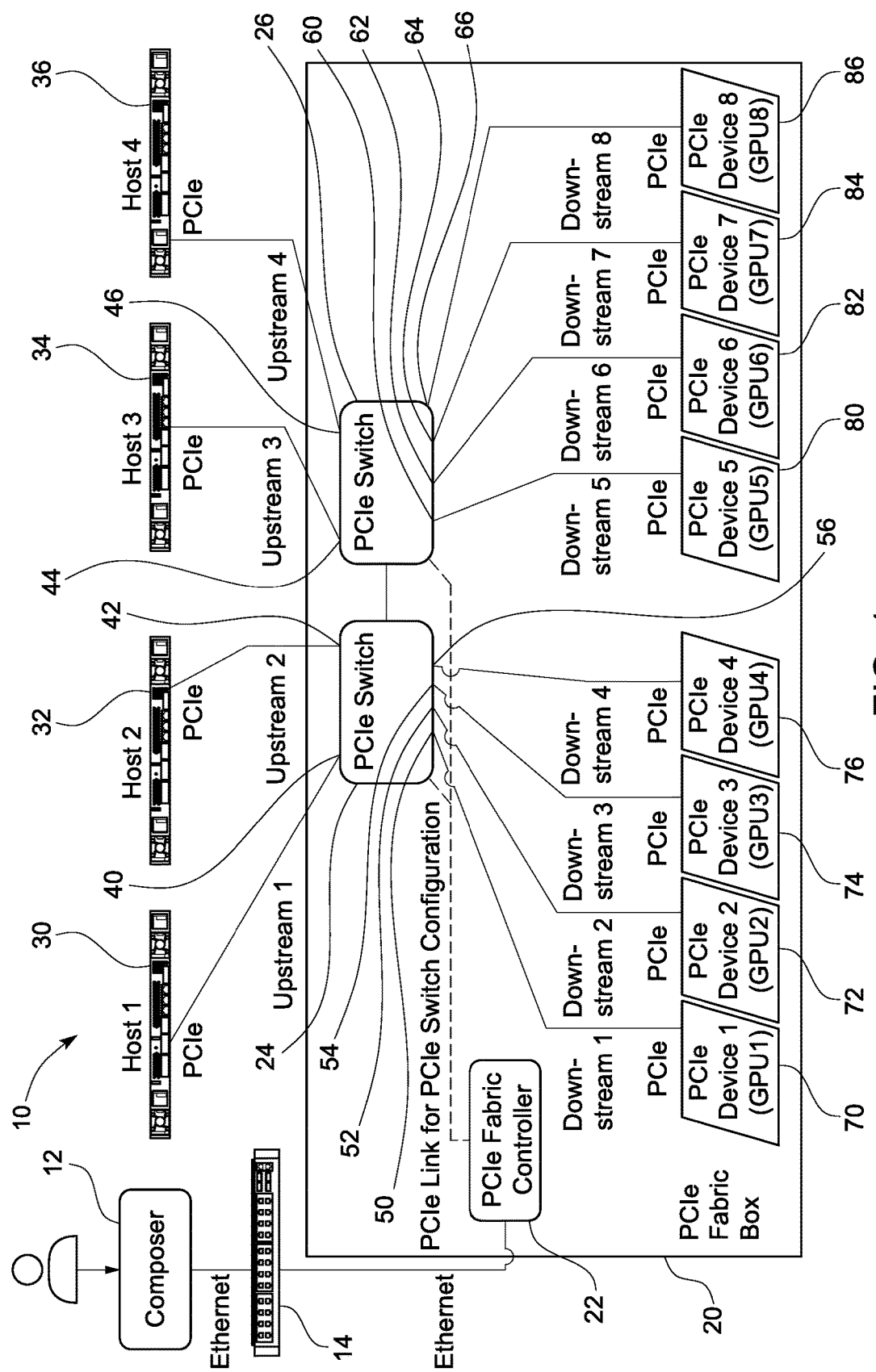
FIG. 1 is an example of a prior art fabric box system for allocation of device resources to different hosts.
Figure 2:
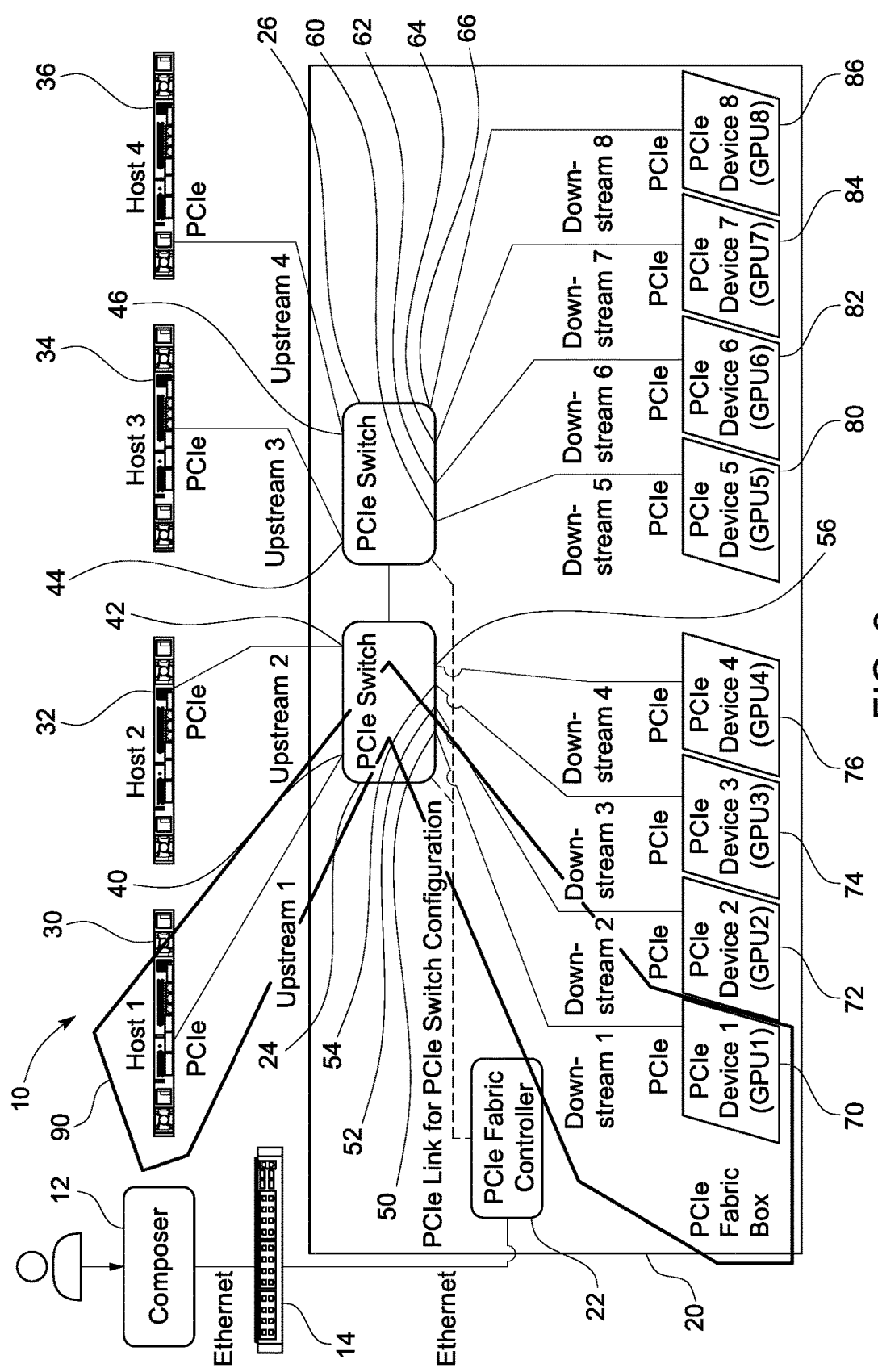
FIG. 2 is a block diagram of the fabric box in FIG. 1 showing allocation of one device to one of the hosts.
Figure 3:
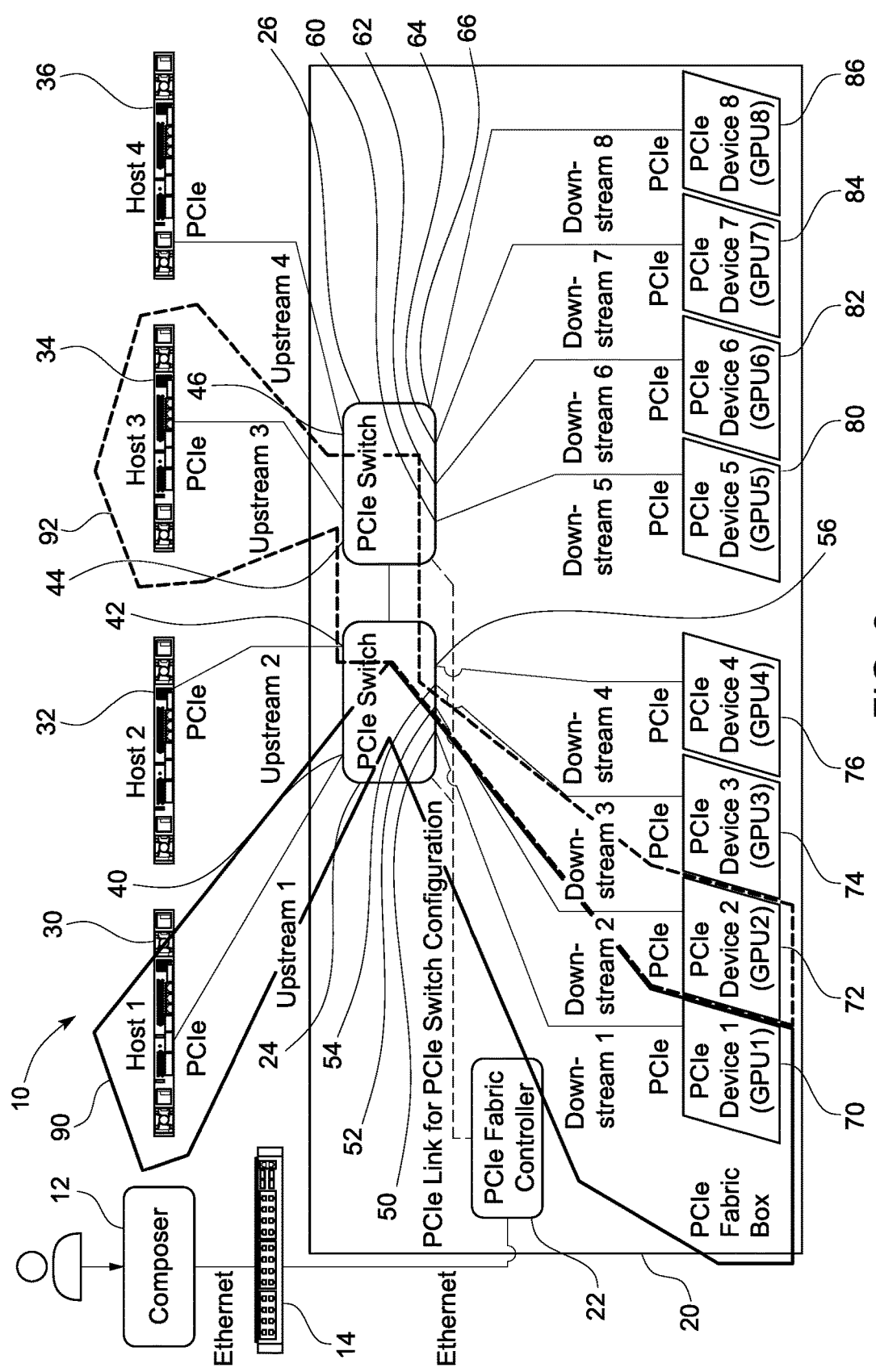
FIG. 3 is a block diagram of the fabric box in FIG. 1 showing a non-optimal allocation of another device to one of the hosts.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

Figure 4:
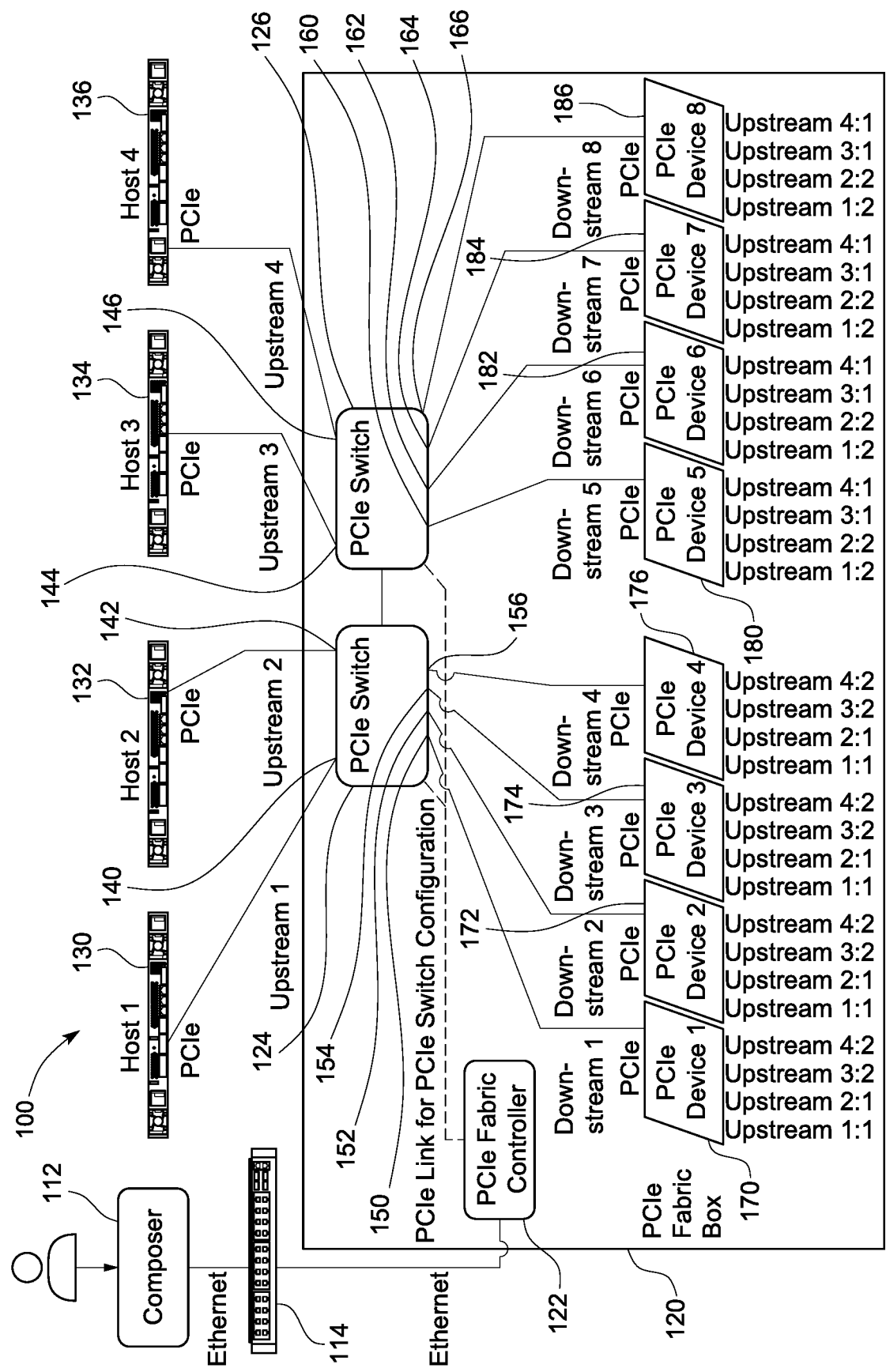
FIG. 4 is a block diagram of an example fabric box system for an efficient allocation of devices to hosts to minimize path distances.

FIG. 4 shows a block diagram of an example distributed device system 100 that allows different device resources to be allocated to hosts in a data center by minimizing path distances. A system administrator may access a composer application 112 that allows allocation commands to be sent to via a router 114 to a Peripheral Component Interconnect Express (PCIe) fabric box 120. The composer application 112 may be executed by a networked management controller operated by the system administrator or any other suitable computing device. The PCIe fabric box 120 includes numerous serial expansion bus devices, such as Peripheral Component Interconnect Express (PCIe) version 3 or version 4 compatible devices, that may be allocated to host servers in the data center. In this example, the PCIe fabric box 120 includes a fabric controller 122 that may receive configuration commands from the composer application 112 through a network from the router 114. The fabric controller 122 executes a control application to allocate devices to host servers using optimal path distances as will be explained below.

The PCIe box 120 includes PCIe switches such as PCIe switches 124 and 126. The switches 124 and 126 allow host devices such as host servers 130, 132, 134 and 136 to be connected to different PCIe devices. The PCIe switch 124 includes upstream ports 140 and 142 and the PCIe switch 126 includes upstream ports 144 and 146. The upstream ports 140, 142, 144, and 146 are connected via a cable to the respective host servers 130, 132, 134, and 136. The PCIe switch 124 also includes downstream ports 150, 152, 154, and 156. The PCIe switch 126 includes downstream ports 160, 162, 164, and 166. In this example, there are devices in the fabric box 120 that are connected to the downstream ports 150, 152, 154, 156, 160, 162, 164, and 166 of the switches 124 and 126. These devices may be accessed by any of the host servers 130, 132, 134, and 136. Such devices are provided power by the fabric box 20 and may communicate via PCIe links to the switches 124 and 126 to other devices. Additional devices may be added to the PCIe box 120 by connection to open downstream ports of one of the switches 124 or 126. Different types of devices may also replace an existing device connected to one of the downstream ports. Additional host servers may also be added to additional upstream ports in the switches. Although, two switches 124 and 126 are shown in this example, additional switches may be added to the fabric box 20 for accommodating additional host servers and devices.

Two host servers 130 and 132 are directly coupled to the upstream ports 140 and 142 of the switch 124, while two host servers 134 and 136 are directly coupled to the upstream ports 144 and 146 of the switch 126. In this example, PCIe compatible devices 170, 172, 174, and 176 are directly coupled to downstream ports 150, 152, 154, and 156 of the PCIe switch 124. PCIe compatible devices 180, 182, 184, and 186 are directly coupled to the downstream ports 160, 162, 164, and 166 of the PCIe switch 126. The PCIe compatible devices may include a non-volatile memory (NVMe), a graphic processing unit (GPU), a field programmable gate array (FPGA), a network interface card (NIC), a redundant array of independent disks (RAID) interface card, an I-IBA card or other kinds of PCIe compatible devices. One or more of the devices 170, 172, 174, 176, 180, 182, 184, or 186 may allocated for use to one of the host servers 130, 132, 134, and 136 though one or both of the switches 124 and 126. As explained below, the allocation takes into account the path distance between the host server and the allocated device. Although four devices are connected to each of the switches 124 and 126 in this example, any number of devices may be connected to each of the switches 124 and 126 based on the number of available downstream ports, and therefore be allocated to one of the host servers.

In this example, each of the devices 170, 172, 174, 176, 180, 182, 184, or 186 are provided with a pre-defined path distance to each host server. The path distance is defined as the number of intermediary switching devices that are required to connect the device to a given host server. When connecting the devices to the downstream ports 150, 152, 154, 156, 160, 162, 164, and 166 of one of the switches 124 or 126, each downstream port 150, 152, 154, 156, 160, 162, 164, and 166 has a pre-defined path distance to a different upstream port that is decided by hardware design of the switch. Thus, path distances may be assigned to any of the devices connected to a particular downstream port.

FIG. 4 shows that each downstream port 150, 152, 154, 156, 160, 162, 164, and 166 of each switch 124 and 126 has path distance information to all the upstream ports (and corresponding hosts) of each switch 124 and 126. For example, the device 170 is connected to the downstream port 150 of the switch 124. The device 170 has a path distance of 1 unit to the two upstream ports 140 and 142 of the switch 124, and a path distance of 2 units to the two upstream ports 144 and 146 of the switch 126, since the switch 124 must be used to communicate to the upstream ports 144 and 146 of the switch 126. The device 180 has a path distance of 1 unit to the two upstream ports 144 and 146 of the switch 126, but a path distance of two units to the two upstream ports 140 and 142 of the switch 124. Thus, when a device is connected to a downstream port of one of the switches 124 and 126, it has path distance information to all of the upstream ports for all connected switches.

In this example, the fabric controller 122 has an application programming interface (API) that exports path distance information obtained from the switches 124 and 126 to the composer 112. This path distance information is provided for the path distance of all devices coupled to downstream ports to all hosts coupled to the upstream ports of the switches 124 and 126.

A code segment that includes the distance information from any device to all of the upstream ports, and therefore to all of the host servers, is shown below. The Zone ID field (e.g., 1-z-1 or 1-z-2) in the code below may be used to map to a specific host or upstream port. The below code segment is used by the composer application 112 to allocate devices of the fabric box 120 in FIG. 4 according to path distance.

```
"Oem": {
  "Quanta_RackScale": {
    "ZoneDistance": [
      {
        "@odata.id": "/redfish/v1/Fabrics/7-ff-1/Zones/7-ff-1-z-1"
        "Distance": 3
      },
      {
        "@odata.id": "/redfish/v1/Fabrics/7-ff-1Zones/7-ff-1-z-2",
        "Distance": 3
      },
      {
        "@odata.id": "/redfish/v1/Fabrics/7-ff-1/Zones/7-ff-1-z-3"
        "Distance": 2
      },
      {
        "@odata.id": "/redfish/v1/Fabrics/7-ff-1/Zones/7-ff-1-z-4"
        "Distance": 2
      }
    ]
  },
}
```

The distance API thus provides the composer application 112 with distance information for all of the devices of the box 120. When a user sends a request to allocate a device for a host to the composer application 112, the composer application 112 can allocate a device with the shortest path distance from the list of available devices of the fabric box 120. If a close device cannot be found, the composer application 112 will find a further device that may require transmission over an additional switch.

In this example, the interface protocol for the distance algorithm is the PCIe Link protocol. However, it is to be understood that the host interface may use other protocols such as Ethernet, Fibre Channel, or InfiniBand. Any type of interface protocol may apply the above described principles in order to arrive at selecting devices with a minimum path distance to the connected host devices.

Figure 5:
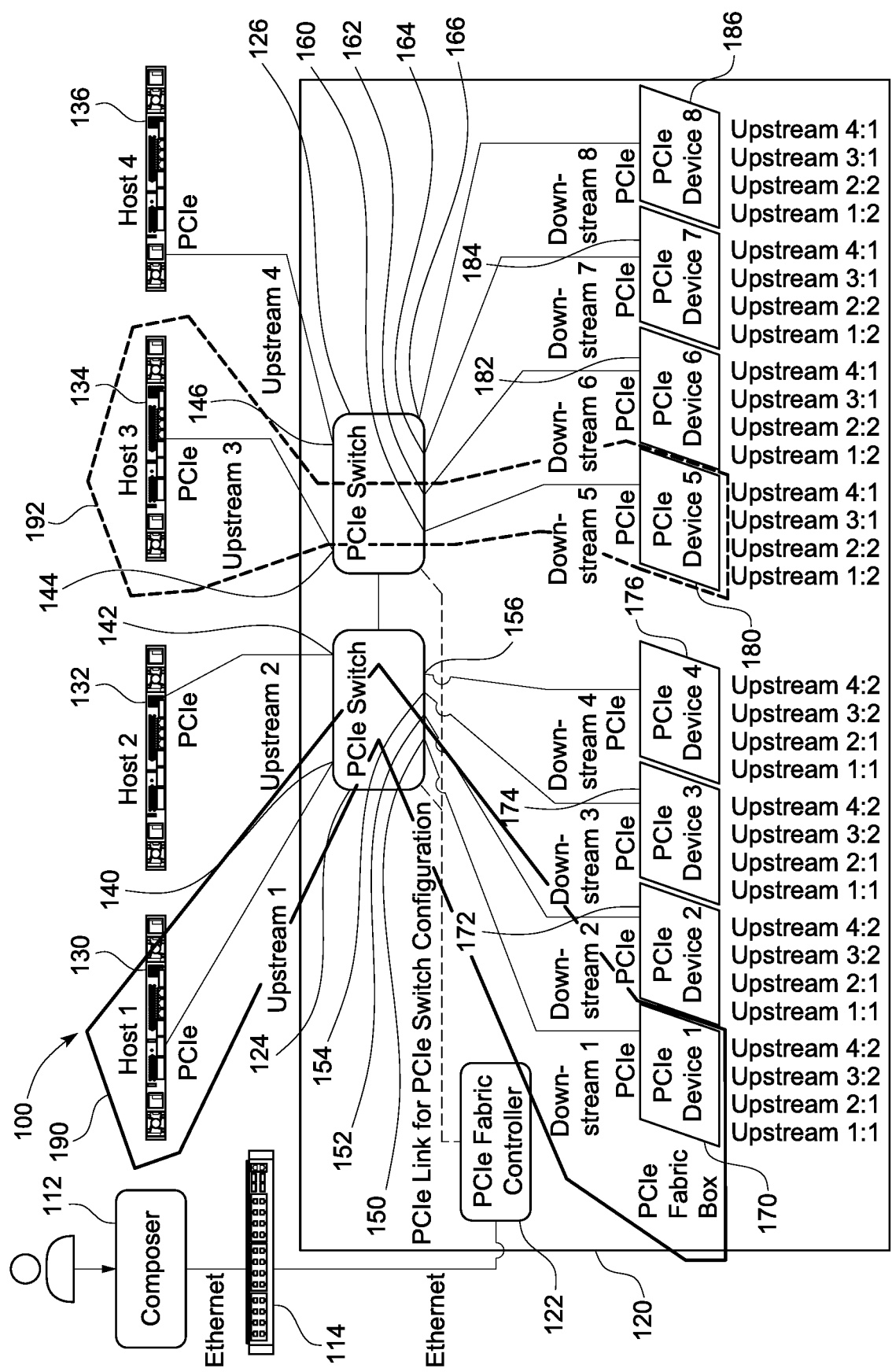
FIG. 5 is a block diagram showing the example fabric box system in FIG. 4 with optimal assignments of devices based on consideration of path distance information between hosts and devices.

According to the distance allocation algorithm, the composer application 112 can successfully allocate devices to hosts with the shortest path distance. FIG. 5 shows resulting device allocations in the system 100 in FIG. 4 in response to the algorithm on the composer application 112 in FIG. 1. Like elements in FIG. 5 are labeled with identical identification numerals in FIG. 4.

In this example, the devices 170, 172, and 180 are GPUs. It may be desirable for a system administrator to allocate a GPU to one of the host servers, such as the host server 130, to assist the server 130 in graphic processing tasks. Thus, the system administrator will request the allocation of a GPU to the host server 130 through the composer application 112. Using the distance algorithm, the composer application 112 will determine the unassigned GPU devices in the fabric box 120 and the path distance between those devices and the requested host server 130. The composer application 112 will then enable the fabric controller 122 to configure the appropriate switch to complete the allocation. In this example, both the devices 170 and 172 have a path distance of 1 to the host server 130, while the device 180 has a path distance of 2 to the host server 130 as the host server 130 is connected to the upstream port 140 of the switch 124. As shown in a box 190 in FIG. 5, the device 170 is thus connected to the host server 130 through the switch 124.

At a later time, the system administrator may desire that a GPU device be allocated to another host server, such as the host server 134. The system administrator will request the allocation of a GPU to the host server 134 through the composer application 112. The composer application 112 will determine the unassigned GPU devices and the path distance between those devices and the requested host server 134. In this example, the available device 172 has a path distance of 2 to the host server 134, while the available device 180 has a path distance of 1 to the host server 134 as the host server 134 is connected to the upstream port 144 of the switch 126. As shown in a box 192 in FIG. 5, the device 180 is thus connected to the host server 134 via the switch 126.

Figure 6:
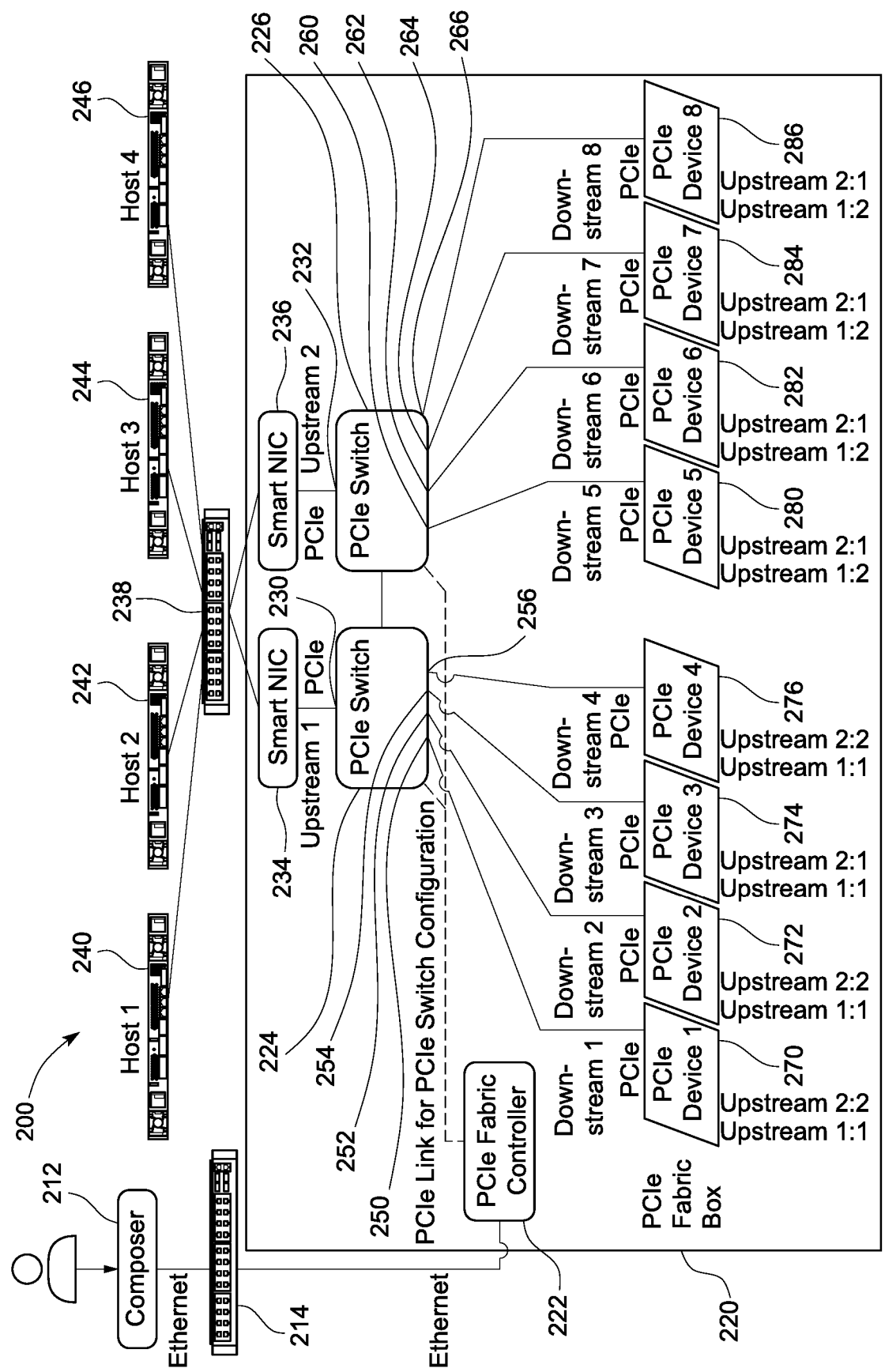
FIG. 6 is a block diagram of an alternate example fabric box with network interface cards for efficient allocation of devices to hosts to minimize distances.

FIG. 6 shows another distributed device system 200 that minimizes path distance to pooled device resources. The system 200 includes a composer application 212 that allows configuration data to be sent via a router 214 to a PCIe fabric box 220. The PCIe fabric box 220 includes PCIe compatible devices that may be accessed by other devices in the data center. In this example, the PCIe fabric box 220 includes a fabric controller 222 that may receive configuration data through a network from the router 214. The fabric controller 222 executes a control application to allocate devices to host servers using the most optimal path distances. The box 220 includes PCIe switches such as the switches 224 and 226. The PCIe switches 224 and 226 each have an upstream port 230 and 232, respectively. The upstream port 230 is connected to smart network interface card (NIC) 234. The upstream port 232 is connected to a smart interface card 236. The network interface cards 234 and 236 are connected to ports of a network switch 238.

Other ports of the network switch 238 are connected to host devices such as host servers 240, 242, 244, and 246. In this system, a network connects the host devices via the network switch 238 to the PCIe fabric box 220. The host servers 240, 242, 244, and 246 may thus be connected to different PCIe devices via the switches 224 and 226 and the network interface cards 234 and 236. In this example, there are devices in the fabric box 220 that are coupled to the switches 224 and 226.

Based on network configuration, two host servers 240 and 242 are coupled to the switch 224 through the smart NIC 234, while two host servers 244 and 246 are coupled to the switch 226 via the smart NIC 236. Other network configurations may be made, such as having three host servers being coupled to one of the switches through the respective NIC and one host server being coupled to the other switch. The PCIe switch 224 also includes downstream ports 250, 252, 254, and 256. The PCIe switch 226 includes downstream ports 260, 262, 264, and 266. In this example, PCIe compatible devices 270, 272, 274, and 276 are coupled to the PCIe switch 224 through the respective downstream ports 250, 252, 254, and 256. PCIe compatible devices 280, 282, 284, and 286 are coupled to the PCIe switch 226 via the respective downstream ports 260, 262, 264, and 266. In this example, one upstream port of the PCIe switches 224 and 226 connects to one of the smart NICs 234 and 236 to share devices to hosts by the network via the network switch 224 or 226. Each of the smart NICs 230 and 232 stores different path distances from the connected host servers to the different devices. Thus, when a request for an allocation of a device to a host server occurs, distance information from one of the smart NICs 230 or 232 may be made available to the same algorithm.

In this example, the devices 270, 276, and 282 are memory devices such as an NVMe. It may be desirable for a system administrator to allocate an NVMe to one of the host servers, such as the host server 240, to assist the server 240 in increasing storage capacity. Thus, the system administrator will request the allocation of an NVMe to the host server 240 through the composer application 212. Using the distance algorithm, the composer application 212 will determine the unassigned a NVMe devices in the fabric box 220 and the path distance between those devices and the requested host server 240. In this example, both the devices 270 and 276 have a path distance of 1 to the host server 240, while the device 282 has a path distance of 2 to the host server 240 as the host server 240 is connected to the upstream port 230 of the switch 224 through the smart NIC 234 and the network switch 238. The device 270 is thus connected to the host server 240 through the switch 224 and the smart NIC 234.

At a later time, the system administrator may desire that an NVMe device be allocated to another host server, such as the host server 244. The system administrator will request the allocation of an NVMe to the host server 244 through the composer application 212. The composer application 212 will determine the unassigned NVMe devices and the path distance between those devices and the requested host server 244. In this example, the available device 276 has a path distance of 2 to the host server 244, while the available device 282 has a path distance of 1 to the host server 244, as the host server 244 is connected to the upstream port 232 of the switch 226 through the smart NIC 236. The device 282 is thus connected to the host server 244 through the switch 226 and the smart NIC 236.

Figure 7:
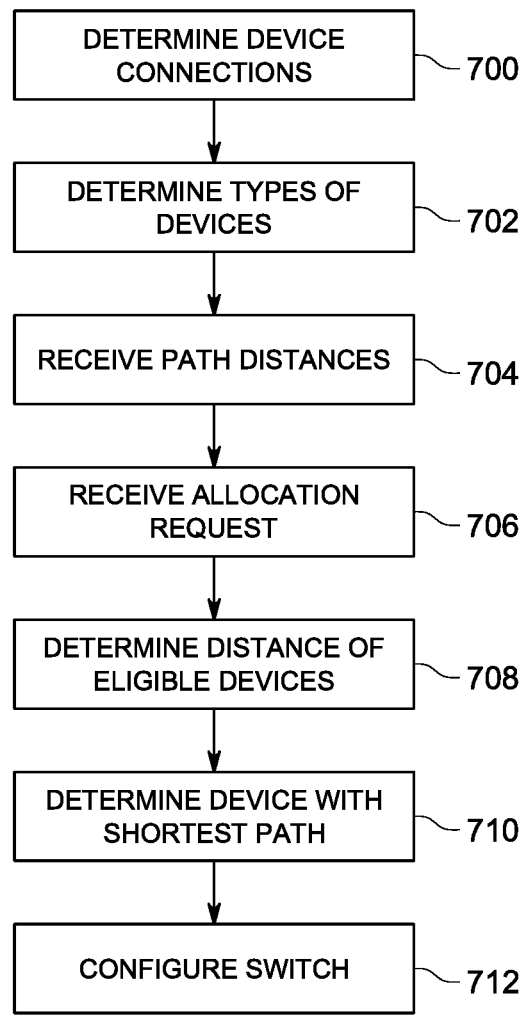
FIG. 7 is a flow diagram of the allocation process assigning devices to hosts for optimal path distance allocation in a fabric box system.

A flow diagram in FIG. 7 is representative of example machine readable instructions for efficient allocation of devices by the fabric controller 122 and or composer 112 in FIG. 4 based on path distance. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowchart illustrated in FIG. 7, persons of ordinary skill in the art will readily appreciate that many other methods of implementing the example machine readable instructions may alternatively be used. For example, the order of execution of the blocks may be changed, and/or some of the blocks described may be changed, eliminated, or combined.

The PCIe fabric controller 122 first determines the devices and hosts that are connected to each of the ports of the switches 124 and 126 (700). The fabric controller 122 will determine the types of devices that are in the fabric box 120 and send the information to the composer application 112 (702). The fabric controller 122 than receives path distance information for each of the downstream ports to each of the upstream ports (704).

The fabric controller 122 receives an allocation request through the router 114 from the composer application 112 (706). The fabric controller 122 reads the requested host and determines the path distances between devices that are appropriate to fulfill the allocation request and the requested hosts (708). The fabric controller 122 then determines the devices with the shortest path distance and selects one of the devices (710). The fabric controller 122 then configures the appropriate PCIe switch to provide a connection between the selected device and the host (712).

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A fabric box, comprising:
   a plurality of fabric switches, each having at least one upstream port to be coupled to a respective host of a plurality of hosts, the plurality of fabric switches comprising a first switch;
   a plurality of devices coupled to downstream ports of one of the plurality of fabric switches; and
   a fabric controller coupled to the plurality of fabric switches, the fabric controller operable to perform operations including:
      obtaining, from the plurality of fabric switches, a path distance information from each of the upstream ports to the respective host of the plurality of hosts;
      based at least in part on the obtained path distance information, determining a path distance between the downstream ports and the upstream ports of the plurality of fabric switches;
      determining a type of device for each of the plurality of devices;
      receiving a request for allocation of a first host of the plurality of hosts to a desired type of device;
      identifying a set of eligible devices from the plurality of devices based on the desired type of device of the request for allocation;
      determining path distances between each of the set of eligible devices and the first host;
      selecting one of the plurality of devices with a shortest path distance to the first host, wherein the shortest path distance is associated with the first switch of the plurality of fabric switches; and
      configuring the first switch of the plurality of fabric switches to connect the first host to the selected device.

2. The fabric box of claim 1, wherein the plurality of devices includes at least one of a non-volatile memory (NVMe), a graphic processing unit (GPU), a field programmable gate array (FPGA), a network interface card (NIC), and a redundant array of independent disks (RAID) interface card.

3. The fabric box of claim 1, wherein the plurality of devices includes at least two different types of devices.

4. The fabric box of claim 1, further comprising a plurality of fabric interface cards, each of the fabric interface cards coupled between one of the upstream ports of one of the plurality of fabric switches, and one of the plurality of hosts.

5. The fabric box of claim 4, wherein each of the plurality of fabric interface cards stores path distance information, and wherein determining a path distance comprises accessing the path distance information of at least one of the plurality of fabric interface cards.

6. The fabric box of claim 1, wherein the fabric controller is operable to send path distance information for each of the plurality of devices to a composer application, and the fabric controller is operable to receive an allocation command from the composer application with the selected device and the first host.

7. The fabric box of claim 1, wherein the switches and devices are connected via a PCIe protocol link.

8. A method of allocating devices to a first host via a fabric box including: a plurality of fabric switches, each having at least one upstream port to be coupled to a respective host of a plurality of hosts, the plurality of fabric switches comprising a first switch; a plurality of devices coupled to downstream ports of one of the plurality of fabric switches; and a fabric controller coupled to the plurality of fabric switches, the method comprising:
obtaining, from the plurality of fabric switches, a path distance information from each of the upstream ports to the respective host of the plurality of hosts;
based at least in part on the obtained path distance information, determining path distances between each of the downstream ports and each of the upstream ports;
determining a type of device for each of the plurality of devices;
receiving a request for allocation of a first host of the plurality of hosts to a desired type of device;
identifying a set of eligible devices from the plurality of devices based on the desired type of device of the request for allocation;
determining path distances between each of the set of eligible devices and the first host;
selecting one of the plurality of devices with a shortest path distance to the first host, wherein the shortest path distance is associated with the first switch of the plurality of fabric switches; and
configuring the first switch of the plurality of fabric switches to connect the first host to the selected device.

9. The method of claim 8, wherein the plurality of devices includes at least one of a non-volatile memory (NVMe), a graphic processing unit (GPU), a field programmable gate array (FPGA), a network interface card (NIC), and a redundant array of independent disks (RAID) interface card.

10. The method of claim 8, wherein the plurality of devices includes at least two different types of devices.

11. The method of claim 8, wherein each of plurality of fabric switches is coupled to a fabric interface card, and wherein each of the plurality of hosts is coupled to network coupled to the fabric interface cards.

12. The method of claim 11, wherein each of the fabric interface cards stores path distance information, and wherein determining the path distances comprises accessing the path distance information of at least one of the plurality of fabric interface cards.

13. The method of claim 8, further comprising:
sending path distance information for each of the plurality of devices to a composer application; and
receiving an allocation command from the composer application with the selected device and the first host.

14. The method of claim 8, wherein the switches and devices are connected via a PCIe protocol link.

15. A system for allocating device resources, the system comprising:
a composer application executed by a management controller;
a fabric box including a plurality of fabric switches and a fabric controller, wherein the plurality of fabric switches comprises a first switch;
a network coupled to the management controller and the fabric box;
a plurality of host servers, each of the host servers coupled to an upstream port of one of the plurality of fabric switches; and
a plurality of device resources, each of the device resources coupled to a downstream port of one the plurality of fabric switches;
wherein the fabric controller is operable to perform operations including:
obtaining, from the plurality of fabric switches, a path distance information from each of the upstream ports to a respective host server of the plurality of host servers;
based at least in part on the obtained path distance information, determining path distances between each of the downstream ports and each of the upstream ports; and
determining a type of device for each of the plurality of devices; and
wherein the composer application is operable to perform operations including:
receiving an allocation command for allocating a requested host server to a desired type of device;
identifying a set of eligible devices from the plurality of devices based on the desired type of device of the allocation command;
determining path distances between each of the set of eligible devices and the requested host server;
selecting one of the plurality of devices with a shortest path distance to the requested host server, wherein the shortest path distance is associated with the first switch of the plurality of fabric switches; and
sending a configuration command, wherein the configuration command, when received, configures the first switch of the plurality of switches to connect the requested host server to the selected device.

16. The system of claim 15, wherein the plurality of device resources includes at least one of a non-volatile memory (NVMe), a graphic processing unit (GPU), a field programmable gate array (FPGA), a network interface card (NIC), and a redundant array of independent disks (RAID) interface card.

17. The system of claim 15, wherein the plurality of device resources includes at least two different types of devices.

18. The system of claim 15, further comprising a plurality of fabric interface cards, each of the fabric interface cards coupled between one of the upstream ports of one of the plurality of fabric switches, and one of the host servers.

19. The system of claim 18, wherein each of the plurality of fabric interface cards stores path distance information, and wherein determining a path distance comprises accessing the path distance information of at least one of the plurality of fabric interface cards.

20. The system of claim 15, wherein the switches and device resources are connected via a PCIe protocol link.

* * * * *